(12) United States Patent
Rieger

(10) Patent No.: US 8,206,483 B2
(45) Date of Patent: Jun. 26, 2012

(54) COMPACT AIR FILTER ELEMENT WITH KNOCK PROTECTION

(75) Inventor: Mario Rieger, Freiberg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 645 days.

(21) Appl. No.: 12/304,820

(22) PCT Filed: Jun. 14, 2007

(86) PCT No.: PCT/EP2007/055898
§ 371 (c)(1),
(2), (4) Date: Jan. 30, 2009

(87) PCT Pub. No.: WO2007/144405
PCT Pub. Date: Dec. 21, 2007

(65) Prior Publication Data
US 2009/0205302 A1 Aug. 20, 2009

(30) Foreign Application Priority Data
Jun. 16, 2006 (DE) .......... 10 2006 028 161

(51) Int. Cl.
*B01D 46/00* (2006.01)
(52) U.S. Cl. ................ 55/498; 55/502; 55/521
(58) Field of Classification Search ........... 55/498, 55/502, 521
See application file for complete search history.

(56) References Cited

U.S. PATENT DOCUMENTS

| | | | |
|---|---|---|---|
| 5,902,364 A * | 5/1999 | Tokar et al. ........... 55/498 |
| 6,517,598 B2 * | 2/2003 | Anderson et al. ........... 55/498 |
| 6,610,126 B2 * | 8/2003 | Xu et al. ........... 95/273 |
| D484,584 S | 12/2003 | Anderson et al. |
| 6,878,190 B1 * | 4/2005 | Xu et al. ........... 95/273 |
| 6,966,940 B2 * | 11/2005 | Krisko et al. ........... 55/497 |
| 6,997,968 B2 * | 2/2006 | Xu et al. ........... 55/495 |
| 7,008,467 B2 * | 3/2006 | Krisko et al. ........... 95/268 |
| 7,393,375 B2 * | 7/2008 | Xu et al. ........... 55/495 |
| 7,396,376 B2 * | 7/2008 | Schrage et al. ........... 55/498 |
| 7,396,377 B2 * | 7/2008 | Lampert et al. ........... 55/502 |
| 7,481,863 B2 * | 1/2009 | Oelpke et al. ........... 55/521 |
| 7,491,254 B2 * | 2/2009 | Krisko et al. ........... 55/337 |
| 7,569,090 B2 * | 8/2009 | Nelson ........... 55/502 |
| 7,645,310 B2 * | 1/2010 | Krisko et al. ........... 55/337 |
| 7,648,545 B2 * | 1/2010 | Amesoeder et al. ........... 55/502 |
| 7,670,402 B2 * | 3/2010 | Miller ........... 55/502 |
| 7,691,166 B2 * | 4/2010 | Xu et al. ........... 55/495 |
| 7,931,724 B2 * | 4/2011 | Schrage et al. ........... 55/498 |
| 7,931,725 B2 * | 4/2011 | Wydeven et al. ........... 55/498 |
| 7,935,166 B2 * | 5/2011 | Schrage et al. ........... 55/498 |
| 2002/0185008 A1 | 12/2002 | Anderson et al. |
| 2005/0166561 A1 | 8/2005 | Schrage |
| 2007/0039296 A1 * | 2/2007 | Schrage et al. ........... 55/497 |

(Continued)

FOREIGN PATENT DOCUMENTS
DE 19619770 A1 * 11/1997
(Continued)

*Primary Examiner* — Robert Clemente

(57) ABSTRACT

A compact filter element (10, 10', 10") is provided with knock protection to protect the filter element against damage, such as may be incurred by tapping or hitting the filter against a hard surface. The filter element includes a filter body (1) having of a wound filter medium and configured for axial flow through its end faces (2). At least at one end face (2) of the filter body (1) a protective collar (3, 3', 3") is provided which surrounds an outer circumference and projects past the end face (2).

5 Claims, 4 Drawing Sheets

U.S. PATENT DOCUMENTS

| | | | |
|---|---|---|---|
| 2007/0186528 A1 * | 8/2007 | Wydeven et al. | 55/498 |
| 2009/0211450 A1 * | 8/2009 | Mosset et al. | 95/273 |
| 2009/0241494 A1 * | 10/2009 | Schrage et al. | 55/500 |
| 2009/0301045 A1 * | 12/2009 | Nelson et al. | 55/498 |

FOREIGN PATENT DOCUMENTS

| | | | |
|---|---|---|---|
| DE | 19731081 A1 * | 1/1999 | |
| DE | 19734081 A1 | 2/1999 | |
| EP | 1736227 A | 12/2006 | |
| EP | 1736227 A1 * | 12/2006 | |
| WO | WO97/40908 A | 11/1997 | |
| WO | WO 9740908 A1 * | 11/1997 | |
| WO | WO03/084641 A | 10/2003 | |
| WO | WO 03084641 A2 * | 10/2003 | |

* cited by examiner

COMPACT AIR FILTER ELEMENT WITH KNOCK PROTECTION

TECHNICAL FIELD

The invention relates to an axial flow filter element and, more particularly, to an axial flow compact filter element including features to protect the filter element from damage.

BACKGROUND OF THE INVENTION

Various types of spirally wound compact filter elements configured for axial flow and housings for these filter elements are known in the art. DE 32 49 151 C2 discloses a compact air filter element comprised of a corrugated filter paper and a flat filter paper. The filter papers are glued together and then wound together to form a filter element of the desired size. Gluing of the filter paper layers is realized by a strip-shaped applied in the edge areas of the filter paper. With this technique the interstices between the corrugated and the flat layers are closed alternatingly at the two end faces so that no direct flow is possible through the channels formed between the filter papers. Air flow, when flowing from the unfiltered air side to the filtered air side, first reaches only branch channel, then passes through the filter paper and flows out from a branch channel on the other side. In comparison to conventional folded filters, these compact air filters have the advantage that for the same size a larger filter surface area is provided or for the same filter surface area a smaller size is made possible.

In folded or pleated filters, servicing of a filter medium is partially done such that the filter insert element is removed from the housing and, by tapping or hitting the filter on a hard surface, the dust collected between the folds may be removed so that the service life of the filter insert element can be minimally increased even when only coarse particles are removed and the fine dust that is clogging the pores of the filter medium remain in place. It is also possible that the filter element can be unintentionally damaged should it impact another object while being exchanged. For an example, in case of a compact air filter element wound from paper layers a detachment of the inner adhesive beads may occur. The adhesive beads connect the corrugated layer and the flat cover layer and also close off the channels formed between the layers at the ends. This can result in direct air flow through the channels from the unfiltered side to the filtered side, which is highly undesirable. If this damaged compact air filter element is positioned upstream in an air intake of an internal combustion engine, this can cause severe motor damage.

In addition to detachment of the adhesive layer, tapping or hitting the filter element against a hard surface can tear the filter paper in a way that the tear then extends across the adhesive bead. In this case it is also possible that unfiltered air loaded with dirt can pass through the compact air filter element can cause damage.

SUMMARY OF THE INVENTION

It is an object of the present invention to improve a compact air filter element that it is better protected with respect to improper handling.

It is proposed to provide a protective collar at least at one end face of the compact air filter element in which the protective collar projects past the end face, in particular one made from an elastomeric material. When a compact air filter element configured in this way is improperly hit with its edges on a surface, the impacts are compensated by the protective collar and tearing in the edge area can be avoided. Moreover, the filter element is protected by the collar when the filter element placed on a wet and/or dirty surface.

Additionally is preferable to provide a main sealing collar at least along the circumference of the compact air filter element with the protective collar comprised of the same elastomeric material as the integrally formed main sealing collar. In particular, the main sealing collar and the protective collar are of a monolithic configuration.

Advantageous in this context is when the protective collar is formed of a brittle material or is provided with a brittle coating. Because the brittle material in case of improper knocking or tapping of the compact air filter element may result in breaks or tears, a kind of seal is provided that provides a permanent indication of improper handling and therefore can protect the manufacturer with respect to unwarranted liability claims. For increased protection against counterfeiting, safety features, for example, holograms, can be embedded into the brittle seal layer.

Alternatively, the protective collar is a sleeve of a rigid material that has a web projecting radially from the compact filter element on which web the main sealing collar is mounted with a receiving groove. The rigid sleeve not only provides an impact protection of the edge but also a protection with regard to folds or dents on the outer skin of the filter should the compact air filter be placed under heavy objects. The combination with the mounted main sealing ring has the additional advantage that the shape of the main sealing ring mounted on the protective collar is stably maintained and does not change upon possibly occurring deformations of the surface of the filter body.

The protective collar can additionally provide a grip protection. The element upon handing during servicing is protected from damage of its outer side.

The protective collar can also additionally serve for clamping the element in the housing and to thus decouple the securing function from the sealing function.

The protective collar in a sleeve shape is connected in a tightly sealed manner to the filter body about the entire circumference in order to prevent leakage flows underneath the protective collar with the mounted main sealing collar.

Preferably, the protective collar extends at least far enough across the length of the compact filter element so that when viewed from the end face at the interior of the compact filter element the adhesive bead located in the vicinity of the end face is bridged.

A further embodiment provides that the protective collar has grip projections or grip depressions that are either directly formed integrally in or on the device or are retrofitted. These aids are configured to facilitate gripping of the filter element and thus the filter change and are configured to extend either across the entire circumference or are segmented.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
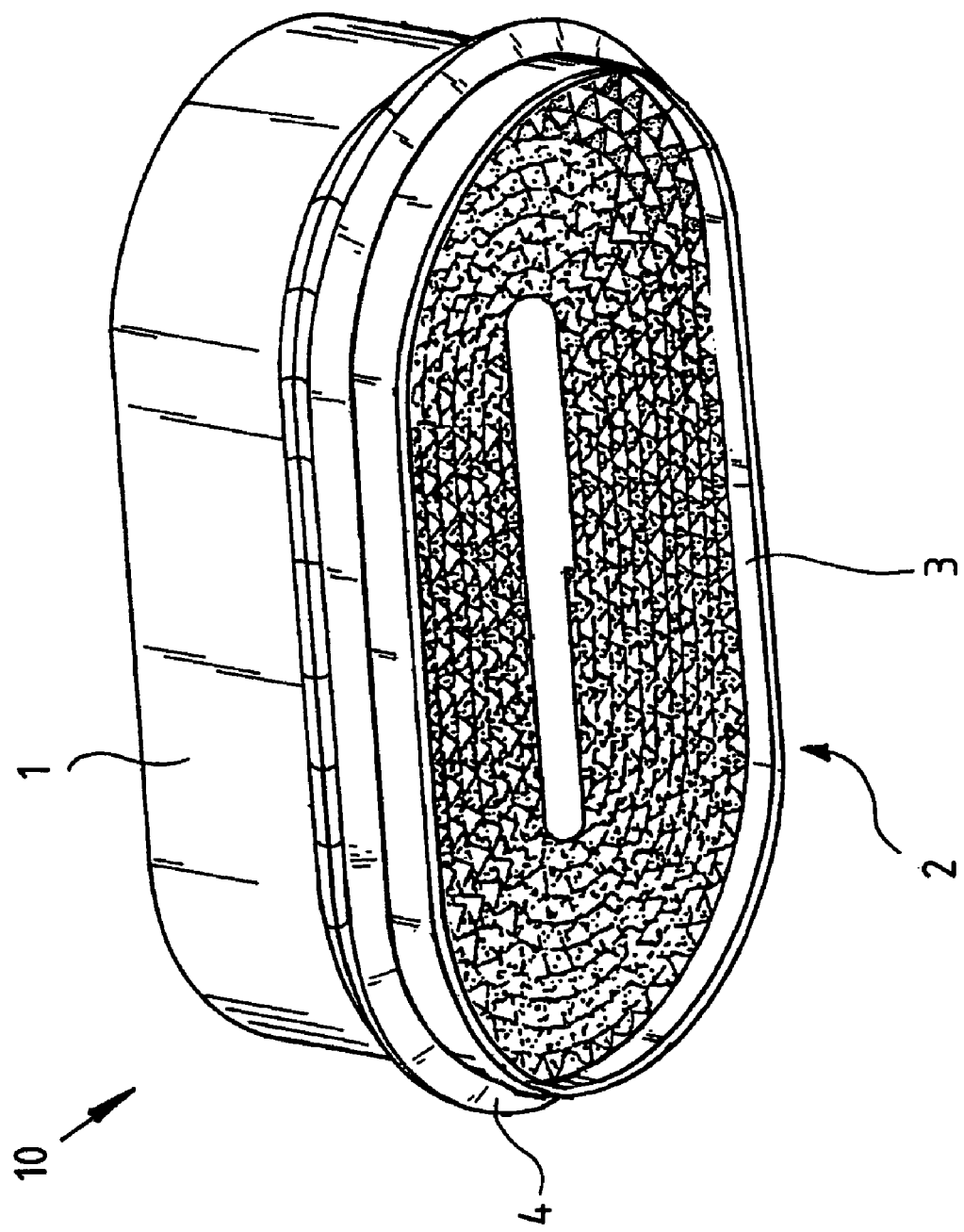
FIG. 1 depicts a perspective view of a compact filter element with protective collar, consistent with the present invention.

FIG. 1 shows in a perspective illustration a compact filter element 10 whose filter body 1 is comprised of a wound filter medium.

The flat filter medium itself is formed of two filter papers that are connected or attached to one another by adhesive beads. In this connection, a corrugated filter paper and a flat filter paper are combined so that between them a plurality of axial channels with semi-circular or triangular cross-sections is formed. When viewed from the intake side, the channels are closed off completely at the ends so that a flow is possible only through the filter papers into the channels located above. These channels, in turn, are closed off relative to the intake side and are open only toward the filtered air side.

In order to compensate for impacts on the edge area of the filter body 1 and in order to provide protection against tears of the filter paper itself or detachment of the adhesive from the paper, a protective collar 3 is mounted on the filter body 1 in accordance with the invention and surrounds the filter body 1 at its circumference in the area of the transition into the end face 2 and projects past the end face 2. The end face 2 in the present illustration indicates the unfiltered air side, i.e., that side where the unfiltered air is drawn in. The opposite side, the filtered air side, can be provided with the same type of protective collar.

For completely sealing an annular gap between the compact air filter element 10 and an air filter housing, a main sealing collar 4 of elastomeric material is provided that surrounds the filter body 1 about the entire circumference and is preferably directly integrally formed on the filter body 1.

Figure 2:
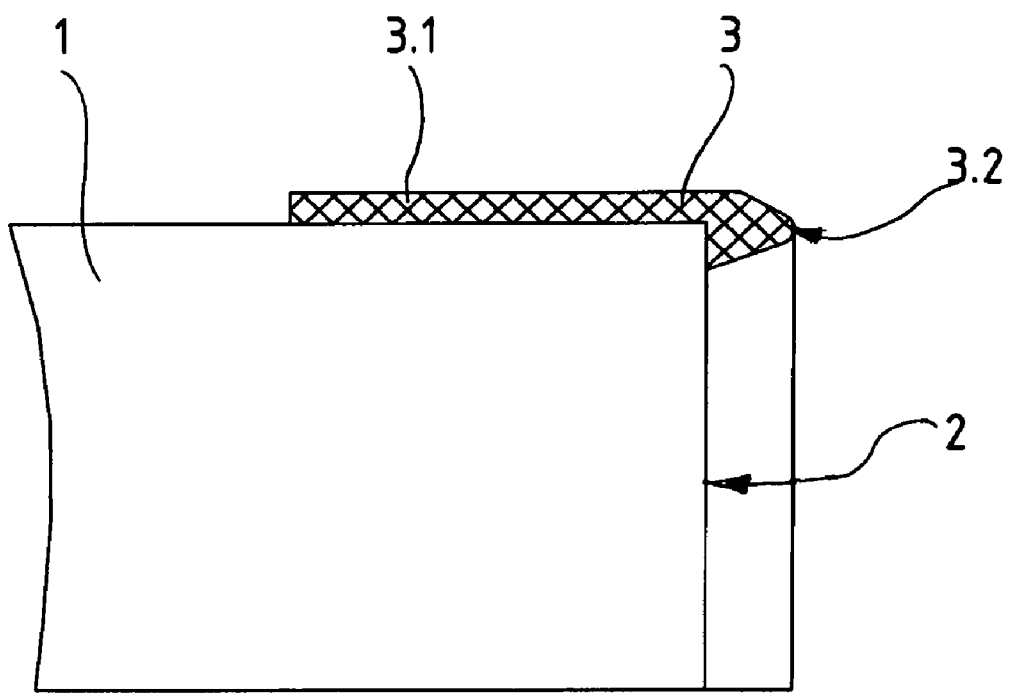
FIG. 2 depicts a sectional view of a first embodiment of a protective collar, consistent with the present invention.

In a first embodiment of a protective collar 3 according to the invention illustrated in FIG. 2, the protective collar 3 is comprised of a thin embracing or grasping area 3.1 that surrounds the filter body 1 and a profiled web 3.2. The cross-sectional area 3.1 of this connection prevents damage of the periphery while the web 3.2 serves to compensate for impacts, for example, by improper knocking or hitting of the filter body 1.

Figure 3:
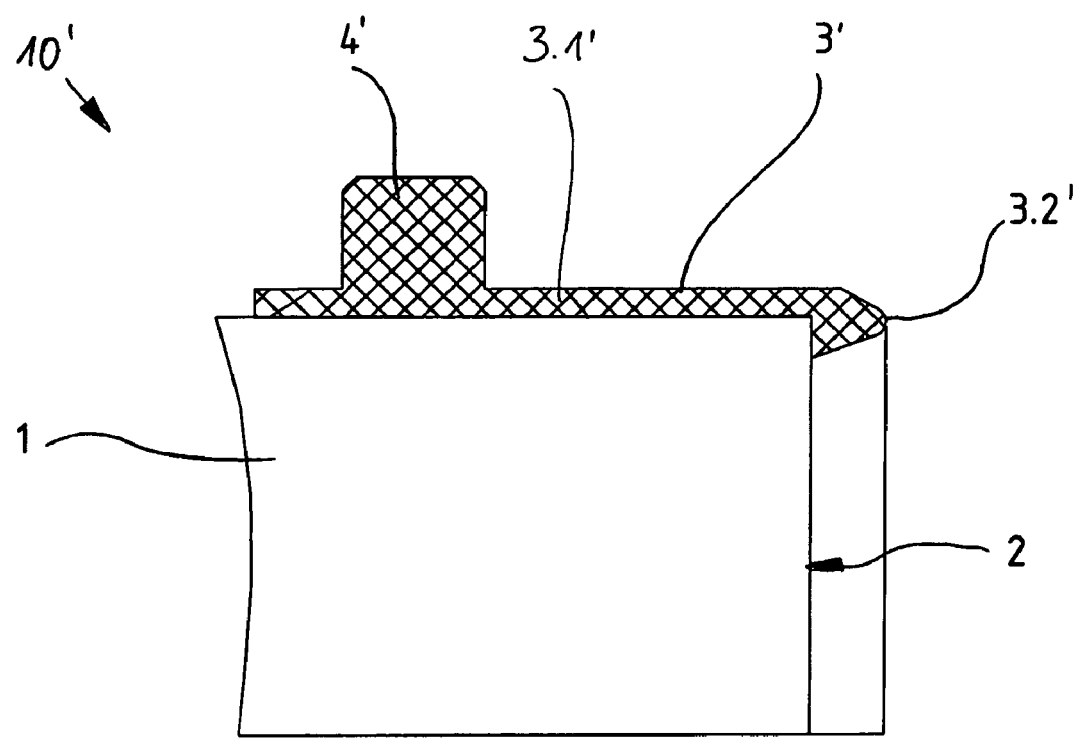
FIG. 3 depicts a sectional view of a second embodiment of a protective collar, consistent with the present invention.

FIG. 3 shows a compact filter element 10' having a second embodiment of a protective collar 3' that comprises a profiled web 3.2' projecting past the end face 2 that, however, has an embracing or grasping area area 3.1 that passes seamlessly into the main sealing collar 4'. The main sealing collar 4' and the protective collar 3' in this embodiment are comprised of the same material and are of a monolithic configuration.

Figure 4:
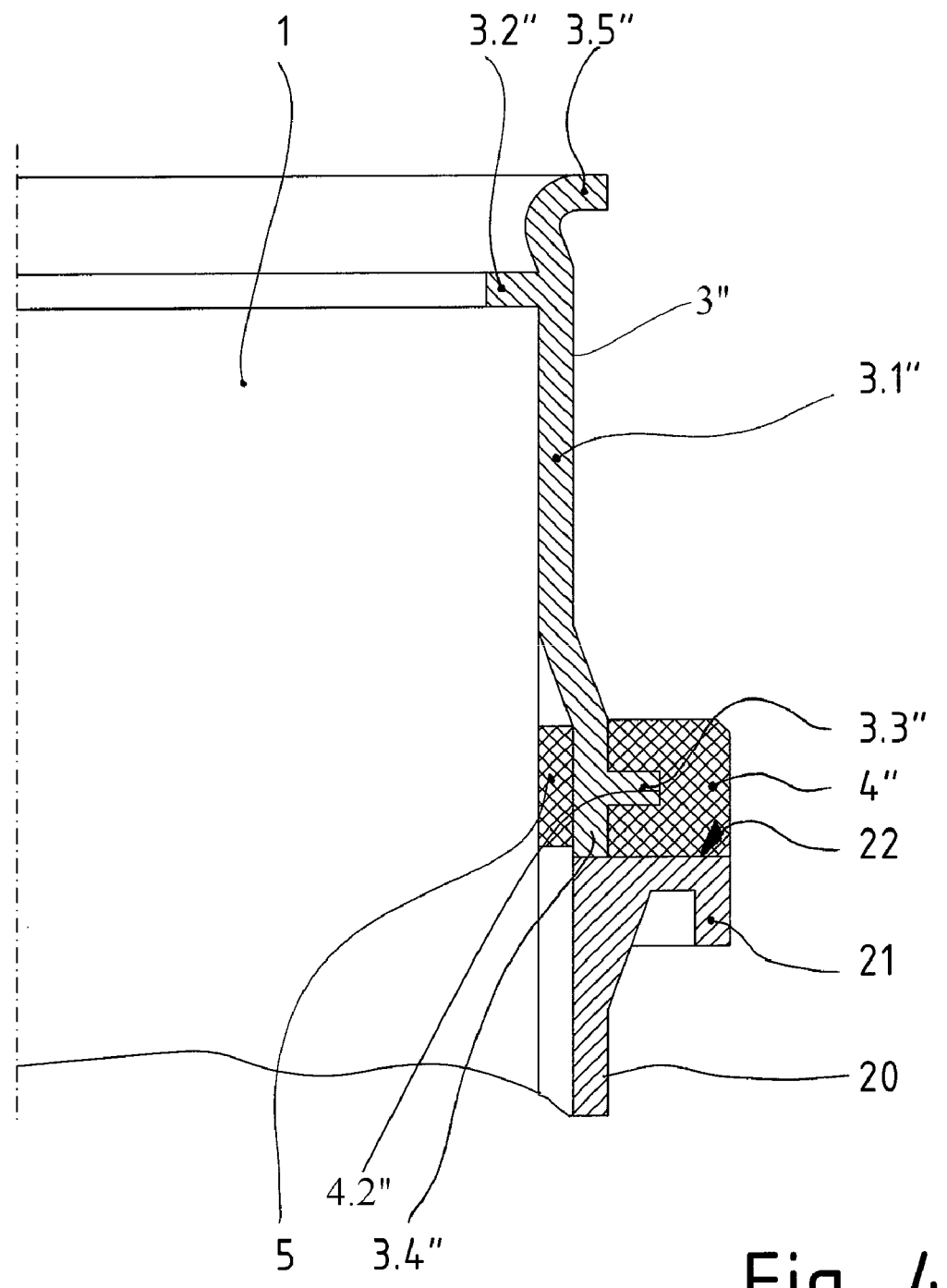
FIG. 4 depicts a sectional view of a third embodiment together with a cup-shaped housing element, consistent with the present invention.

FIG. 4 shows a further embodiment of a protective collar 3" which in this case is not comprised of an elastomeric material but instead of a rigid material, in particular a thermoplastic material. It comprises in cross-section a double angle configuration wherein an angle member 3.2" engages the front edge at the end face of the filter body 1 and the other angle member 3.3" projects as a web radially from the circumference of the filter body. A matching main sealing collar 4" has a receiving groove 4Z by means of which the main sealing collar 4" is mounted on the angle member 3.3".

The filter body 1 and the protective collar 3" are inserted into a cup-shaped housing element 20 so that a housing is formed in which the filter body 1 is enclosed. An additional sealing ring 5 or a circumferentially injected filling material seals the filter body 1 relative to the protective collar 3".

Beyond the angle member 3.3", the wall 3.1" of the protective collar 3" extending along the filter body has a transition into a section 3.4" that is supported on a flange surface 22 of flange 21 of the cup-shaped housing 20. Pressing forces for connecting protective collar 3" and cup-shaped housing element 20 are transmitted only in the area of the flange surface 22 between the housing parts, which are made from hard plastic material. The main sealing collar 4" secured on the angle member 3.3" on the other hand is not loaded by the pretensioning forces and can therefore be configured to be softer.

A grip projection 3.5" is formed in order to be able to remove the compact filter element 10" easily from the housing cup 20 for a filter change after the connection to the housing has been released.

While the best modes for carrying out the invention have been described in detail, those familiar with the art to which this invention relates will recognize various alternative designs and embodiments for practicing the invention within the scope of the appended claims.

The invention claimed is:

1. A compact filter element with knock protection, comprising:
    a filter body including
        a wound filter medium and configured for axial flow through its end faces,
        an elastomeric protective collar mounted on and surrounding an outer circumference of the wound filter medium and projecting axially outwardly past a first one of the end faces, the protective collar including:
            an annular embracing or grabbing portion mounted onto, extending along and surrounding an outer circumference of the filter medium,
            a profiled web portion protecting axially outwardly past the first end face,
        wherein the protective collar is a monolithic one-piece elastomeric component,
        wherein the profiled portion includes an angled member contacting and extending radially inwardly on the first end face.

2. The compact filter element according to claim 1, wherein the elastomeric protective collar includes a radially outwardly extending main sealing collar extending along the circumference of the filter body,
    wherein the main sealing collar is integrally formed on the protective collar and of the same elastomeric material.

3. The compact filter element according to claim 2, wherein the embracing portion has a radially inward side completely contacting the outer circumference of the wound filter medium.

4. The compact filter element according to claim 1, wherein the compact filter element comprises
    at least one layer of flat filter paper and
    one layer of corrugated filter paper that are connected to one another by adhesive beads applied in the edge area of the filter papers,
    in which the adhesive beads close off channels formed between the papers at the ends, and in that an embracing area of the protective collar across the length of the filter body, viewed from the end face, such that the adhesive beads in the interior of the compact filter element located in the vicinity of the end face are bridged.

5. The compact filter element according to claim 1, wherein the protective collar is provided with a brittle coating configured to break or tear under improper handling of the filter element.

* * * * *